(12) United States Patent
Faymon et al.

(10) Patent No.: US 6,633,828 B2
(45) Date of Patent: Oct. 14, 2003

(54) SPEED SIGNAL VARIANCE DETECTION FAULT SYSTEM AND METHOD

(75) Inventors: Dave Faymon, Phoenix, AZ (US); Yufei Xiong, Phoenix, AZ (US); John Rushinsky, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 10 days.

(21) Appl. No.: 09/815,177

(22) Filed: Mar. 21, 2001

(65) Prior Publication Data

US 2002/0138230 A1 Sep. 26, 2002

(51) Int. Cl.[7] .................................................. G01P 3/00
(52) U.S. Cl. ..................... 702/146; 702/147; 702/142; 702/700; 702/95; 702/60; 702/772
(58) Field of Search ................................. 702/147, 142, 702/146; 700/95, 96, 169, 173, 174; 60/772, 773, 779, 789

(56) References Cited

U.S. PATENT DOCUMENTS

| | | |
|---|---|---|
| 4,161,101 A | 7/1979 | Drummond |
| 4,478,038 A | 10/1984 | Cropper et al. |
| 4,651,518 A | 3/1987 | McLaughlin et al. |
| 4,959,954 A | 10/1990 | Nishijima |
| 4,993,221 A | 2/1991 | Idelchik |
| 4,999,991 A | 3/1991 | Haddad et al. |
| 5,048,285 A * | 9/1991 | Schmitt et al. ............... 60/204 |
| 5,107,673 A | 4/1992 | Sato et al. |
| 5,127,220 A | 7/1992 | Jesrai et al. |
| 5,235,801 A | 8/1993 | Evenson et al. |
| 5,235,802 A | 8/1993 | Barnum et al. |
| 5,385,013 A | 1/1995 | Barron et al. |
| 5,402,632 A | 4/1995 | Nobre et al. |
| 5,575,144 A | 11/1996 | Brough |
| 5,622,042 A | 4/1997 | Mirsky et al. |
| 5,680,753 A | 10/1997 | Hollinger et al. |
| 5,694,760 A | 12/1997 | Baxter |
| 5,718,111 A | 2/1998 | Ling et al. |
| 5,726,891 A | 3/1998 | Sisson et al. |
| 6,003,296 A | 12/1999 | Citeno et al. |

FOREIGN PATENT DOCUMENTS

JP                 402074629 A  *  3/1990  .......... D01H/1/241

* cited by examiner

Primary Examiner—John Barlow
Assistant Examiner—Stephen Cherry
(74) Attorney, Agent, or Firm—Robert Desmond, Esq.

(57) ABSTRACT

A method and a system is provided, useable in electrical control sensors for shaft speed signal frequency change rate tests, detecting intermittent or "in-range" failures. The method estimates a short-term variance (standard deviation) of the measured signal or signal rate of change, using the equation: $Var[x]=E[x^2]-E^2[x]$, where $E[x^2]$ is an estimated average of the squared measured signal or rate of change over the short term, and $E^2[x]$ is a squared estimated average of the measured signal or rate of change over the short term. The estimated variance is compared with a predefined variance limit for a predefined amount of time, and if the estimated variance exceeds the predefined variance limit for the predefined amount of time, the measured signal is deemed invalid. A latching counter is used for timing, and its time out rate is preferably proportional to the time period the measured input is true. The step for estimating a short-term variance of the measured signal uses several filters performing averaging function.

12 Claims, 5 Drawing Sheets

SPEED SIGNAL VARIANCE DETECTION FAULT SYSTEM AND METHOD

BACKGROUND OF THE INVENTION

The present invention generally relates to turbine engines and, more particularly, to a method and system used in electrical control sensors for shaft speed signal frequency change rate tests.

Compressor and load shaft speeds are the primary control parameters of gas turbine engines. Accurate speed measurement is essential for proper engine control. In modern engines with electronic control systems, shaft speeds are typically measured using passive variable reluctance magnetic speed sensors, which sense passing of gear teeth or similar objects. The sensors output an electrical signal to the gas turbine electronic control unit (ECU), with signal frequency proportional to the shaft speed (i.e., passing speed of the gear teeth). The ECU measures the speed by measuring the frequency of the speed pickup signal. The ECU typically conducts reasonableness tests to insure the accuracy of the signal before using it. These may include sensor impedance tests (to check whether the electrical characteristics of the sensor appear normal), and signal frequency range and change rate tests (to check whether the resulting signal characteristics appear normal, within the expected range and not changing at an unreasonable rate).

The conventional signal frequency change rate tests used to detect intermittent or "in-range" failures are unreliable because they either often detect failures that do not truly exist (false alarms) or, in order to avoid generation of false alarms, they miss real failure events. There are four typical failure modes that need to be addressed by signal frequency change rate type tests. First failure mode includes intermittent electrical sensor failures that cause a noisy signal. The other three failure modes include "in-range" failures. Second failure mode includes internal sensor failures which can cause "multiple crossings" or cases where higher than normal speeds are read occasionally. Third failure mode includes damaged gear teeth, shaft runout or excessive speed pickup installation gaps, and can cause "missed teeth" and resultant speed measurement errors. Some conventional controllers even have added sophisticated hardware circuits to detect "missing teeth". On turbofans, the fourth failure mode is a catastrophic engine failure event called a "blade out", which causes the controller to perceive speed incorrectly and fuel the engine up.

As can be seen, there is a need for a method and system for implementing signal frequency change rate tests, useable for detection of four intermittent or "in-range" failure modes discussed above, which is more reliable and less complex.

SUMMARY OF THE INVENTION

In one aspect of the present invention, a system useable in electrical control sensors for shaft speed signal frequency change rate tests, detects intermittent or "in-range" failures. It has means for measuring frequency of a shaft speed signal; means for estimating a short-term variance of the measured signal using the equation: $Var[x]=E[x^2]-E^2E^2[x]$, where $E[x^2]$ is an estimated average of the squared measured signal over a short time interval, and $E^2[x]$ is a squared estimated average of the measured signal over a short time interval; means for comparing the estimated short term variance with a predefined variance limit for a predefined amount of time; and means for deeming the measured signal invalid, if the estimated variance exceeds the predefined variance limit for the predefined amount of time.

In another aspect of the present invention, a system useable in electrical control sensors for shaft speed signal frequency change rate tests, detecting intermittent or "in-range" failures, has means for measuring frequency of a shaft speed signal; means for calculating a rate of change (time derivative) of the measured signal; means for estimating a short-term variance of the measured signal rate of change using the equation: $Var[x]=E[x^2]-E^2[x]$, where $E[x^2]$ is an estimated average of the measured signal squared rate of change over a short time interval, and $E^2[x]$ is a squared estimated average of the measured signal rate of change over a short time interval; means for comparing the estimated short term variance with a predefined variance limit for a predefined amount of time; and means for deeming the measured signal invalid, if the estimated variance exceeds the predefined variance limit for the predefined amount of time.

In a further aspect of the present invention, a method useable in electrical control sensors for shaft speed signal frequency change rate tests, detecting intermittent or "in-range" failures, has the steps: (a) measuring frequency of a shaft speed signal; (b) estimating a short-term variance of the measured signal using the equation: $Var[x]=E[x^2]-E^2[x]$, where $E[x^2]$ is an estimated average of the squared measured signal over a short time interval, and $E^2[x]$ is a squared estimated average of the measured signal over a short time interval; (c) comparing the estimated short term variance with a predefined variance limit for a predefined amount of time; and (d) if the estimated variance exceeds the predefined variance limit for the predefined amount of time, deeming the measured signal invalid.

In yet another aspect of the present invention a method useable in electrical control sensors for shaft speed signal frequency change rate tests, detecting intermittent or "in-range" failures, has the steps: (a) measuring frequency of a shaft speed signal; (b) calculating a rate of change (time derivative) of the measured signal; (c) estimating a short-term variance of the measured signal rate of change using the equation: $Var[x]=E[x^2]-E^2[x]$, where $E[x^2]$ is an estimated average of the measured signal squared rate of change over a predefined short term, and $E^2[x]$ is a squared estimated average of the measured signal rate of change over the predefined short term; (d) comparing the estimated variance with a predefined variance limit for a predefined amount of time; and (e) if the estimated variance exceeds the predefined variance limit for the predetermined amount of time, deeming the measured signal invalid.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention includes a speed signal variance detection fault logic system and method, available for signal frequency change rate tests, used to detect intermittent or "in-range" failures. It is more reliable than reasonableness rate tests, due to better failure detection with fewer false alarms. Moreover, it is less complex because it avoids the use of complex missing tooth detectors.

Although developed for compressor and load shaft speed parameters of gas turbine engines, the method and system of the present invention can be applied for testing other sensed signals, such as exhaust gas temperature (EGT) probes signals, presently using other signal change rate tests.

The preferred methods of the present invention either calculate an estimate of the variance of the tested signal, or calculate an estimate of the variance of the rate of change of the tested signal. Due to oversampling, valid engine signals or signals rate of change do not change much and the change is smooth. Thus, they show a high autocorrellation and small variance over the short term. Erratic signals, such as signals corrupted by electrical noise, show rapid changes during certain failures, the signal becomes much less correllated and thus the variance increases. For the four speed signal failure modes discussed above, the speed signal becomes much less correllated and the variance of the signal or signal rate of change increases dramatically, allowing detection by a simple algorithm.

Variance of a signal x is defined by the equation:

$$\text{Variance}[x] = E[x^2] - E^2[x]$$

where E is an expectation operation used to estimate average of a signal x.

One method embodiment of the present invention estimates the short-term variance of a signal using the following algorithm:

$$\text{Variance}[\text{signal}] = \text{Filtered}[(\text{signal})^2] - (\text{Filtered}[\text{signal}])^2$$

In this algorithm the approximate value of the expectation operation (E), which is the estimated short term average a signal x, is obtained by an averaging filter.

Figure 1:
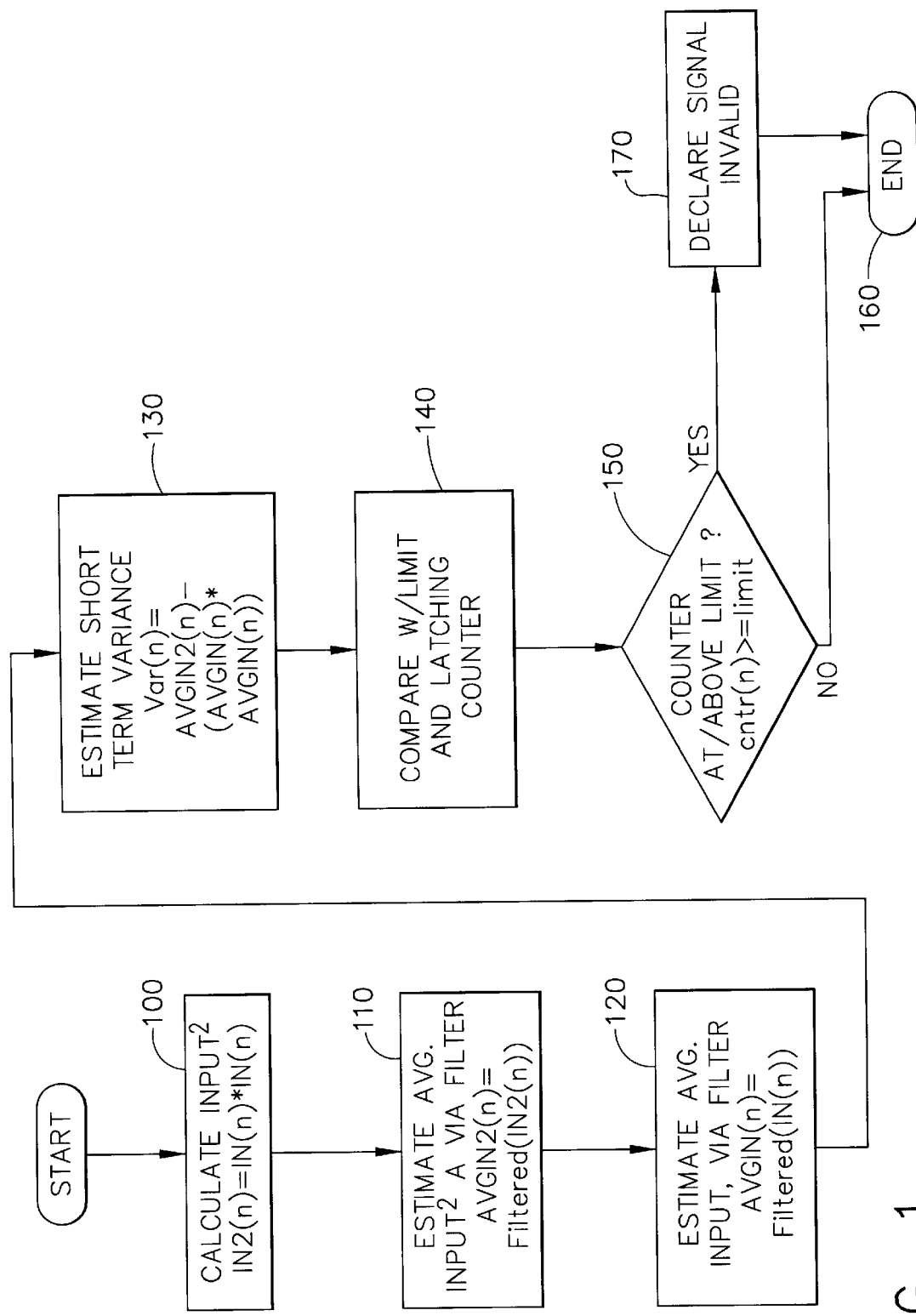
FIG. 1 depicts a top level flowchart of a method for estimation of the short-term variance of a signal, according to a preferred embodiment of the present invention.

FIG. 1 illustrates a top level flowchart of this method embodiment of the present invention, for estimation of the short-term variance of a signal. In step 100, the tested input signal is squared. In step 110, an estimate average of the squared input signal is obtained via filtering, generating an estimate of the average of $x^2$ over the short term. In step 120, an estimate average of the input signal is obtained via filtering. It is then squared, generating a squared estimate of the average of x over the short term, for use in step 130. In step 130, an estimate of the short term variance is calculated, using the equation for variance: $\text{Var}[x] = E[x^2] - E^2[x]$, where E is the expectation operator, or average. In step 140, the estimated variance value is compared with a predefined variance limit and latching counter of the rate test. In step 150, it is tested whether the estimated variance exceeds the predefined limit for a given amount of time. If not, the test is over in step 160. If the estimated variance exceeds the predefined limit for a given amount of time, in step 170, the signal is deemed to be inaccurate and invalid because the variance is too high to be that of a real signal.

Figure 2:
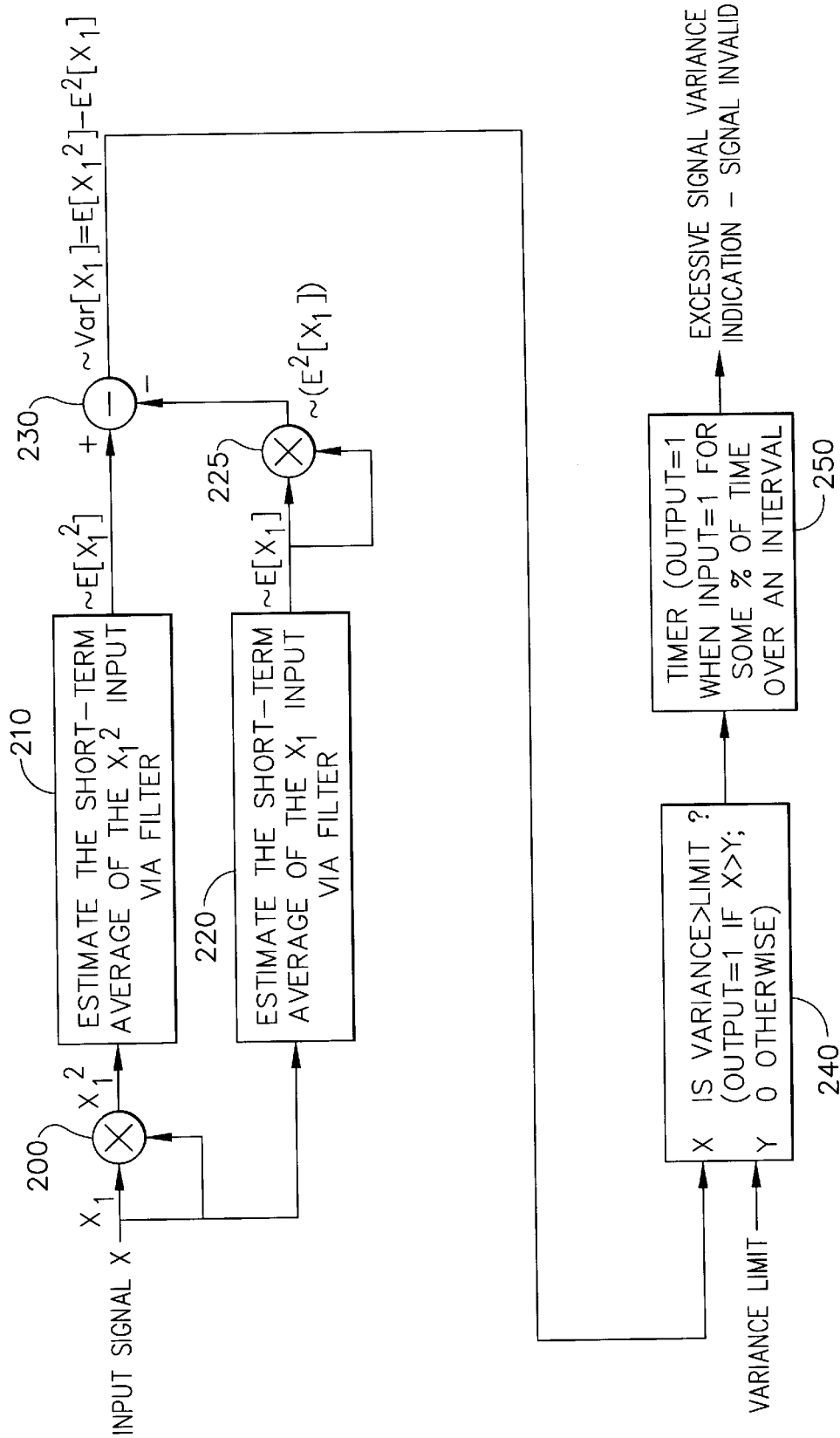
FIG. 2 depicts a block diagram of a signal variance detection logic used for estimation of the short-term variance of a signal according to a preferred embodiment of the present invention.

FIG. 2 illustrates a block diagram of a signal variance detection logic which implements the method embodiment of the present invention, used for estimation of the short-term variance of a signal. In a multiplier 200, the tested input signal is squared. In element 210, an estimate average of the squared input signal is obtained via filtering. In element 220, an estimate average of the input signal is obtained via filtering. In multiplier 225, this signal is squared. In element 230, an estimate variance is calculated by subtraction of the two estimated signals obtained from elements 210 and 225. In element 240, the calculated estimated variance value is compared with a predefined variance limit of the rate test. In latching counter (timer) 250, it is tested whether the estimated variance exceeds the predefined variance limit for a predefined amount of time. If the estimated variance exceeds the predefined limit for a given amount of time, the signal is deemed to be inaccurate and invalid because the variance is too high to be that of a real signal.

Figure 3:
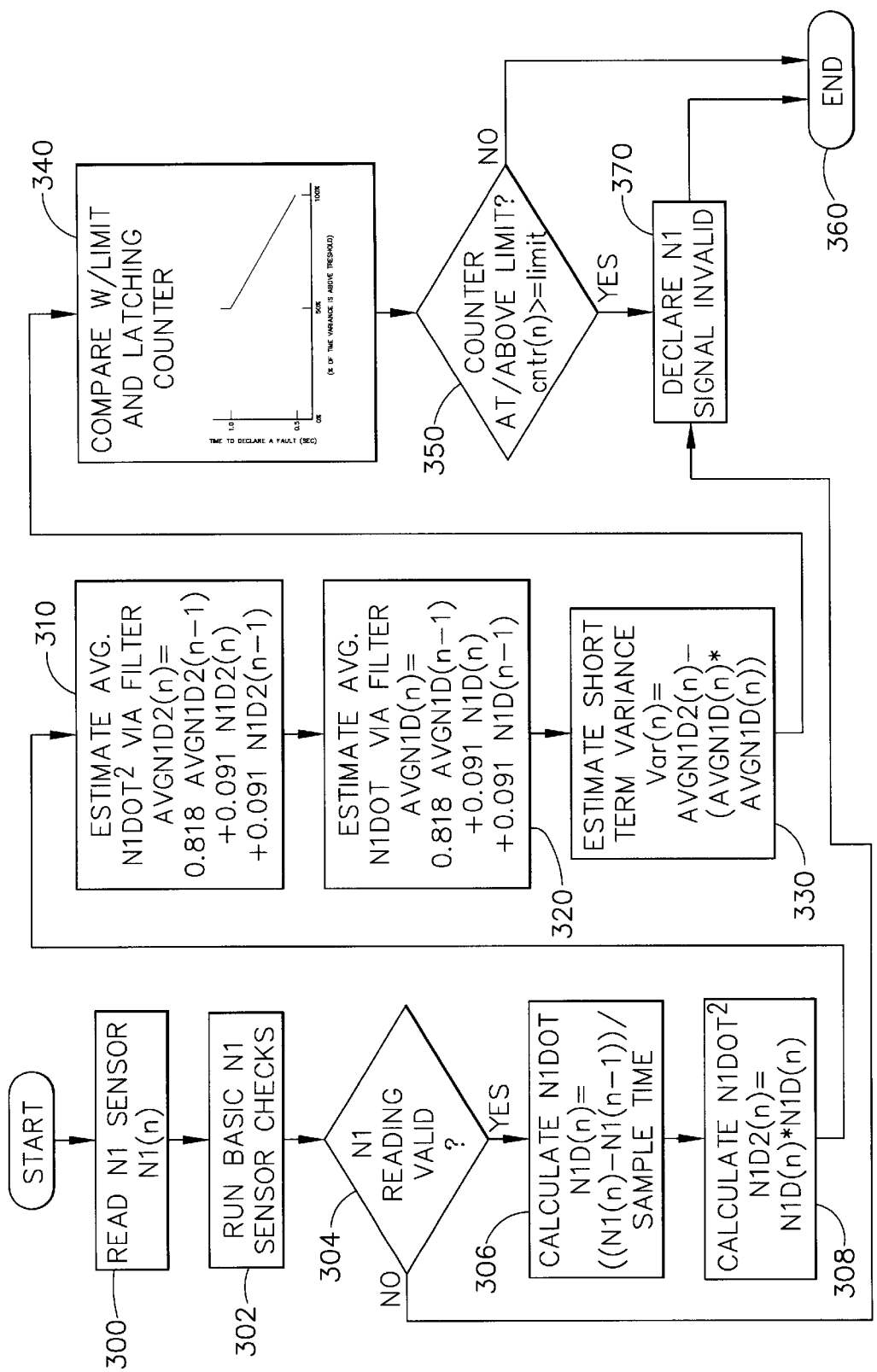
FIG. 3 depicts a flowchart of a method for estimation of the short-term variance of a signal rate of change according to a preferred embodiment of the present invention.

In another method embodiment of the present invention, illustrated in FIG. 3, an estimated variance of the signal rate of change is calculated. For example, for engine compressor fans having speed signal Nfan, it is preferable to calculate the estimated variance of the speed signal rate of change d(Nfan)/dt, using the equation:

$$\text{Variance}[d(\text{Nfan})/dt] = \text{Filtered}[(d(\text{Nfan})/dt)^2] - (\text{Filtered}[d(\text{Nfan})/dt])^2$$

In this algorithm, the approximate value of the expectation operation (E), which is the estimated short term average signal x, is obtained by a filter.

FIG. 3 illustrates a flowchart of this method embodiment of the present invention, for estimation of the short-term variance of a signal rate of change. This flowchart shows variance detection as actually implemented in AS900 turbofan engine manufactured by Honeywell International, Inc. Thus, it shows several preliminary testing steps 300–304. In step 300, a sensor is read to obtain the tested signal. In step 302, the sensor is tested. In step 304, it is determined whether the reading is valid and, if not, step 370 is executed. If valid, in step 306, the rate of change of the signal is calculated. In step 308, the tested input signal is squared. In step 310, an estimate average of the squared input signal is obtained via filtering, generating an estimate of the average of $x^2$ over the short term. In step 320, an estimate average of the input signal is obtained via filtering. It is then squared, generating a squared estimate of the average of x over the short term, for use in step 330. In step 330, an estimate of the short term variance is calculated using the equation for variance: $\text{Var}[x] = E[x^2] - E^2[x]$, where E is the expectation operator, or average.

In step 340, the estimated variance value is compared with a predefined variance limit and latching counter of the rate test. In step 350, it is tested whether the estimated variance exceeds the predefined limit for a given amount of time. If not, the test is over in step 360. If the estimated variance exceeds the predefined limit for a given amount of time, in step 370, the signal is deemed to be inaccurate and invalid because the variance is too high to be that of a real signal.

Figure 4:
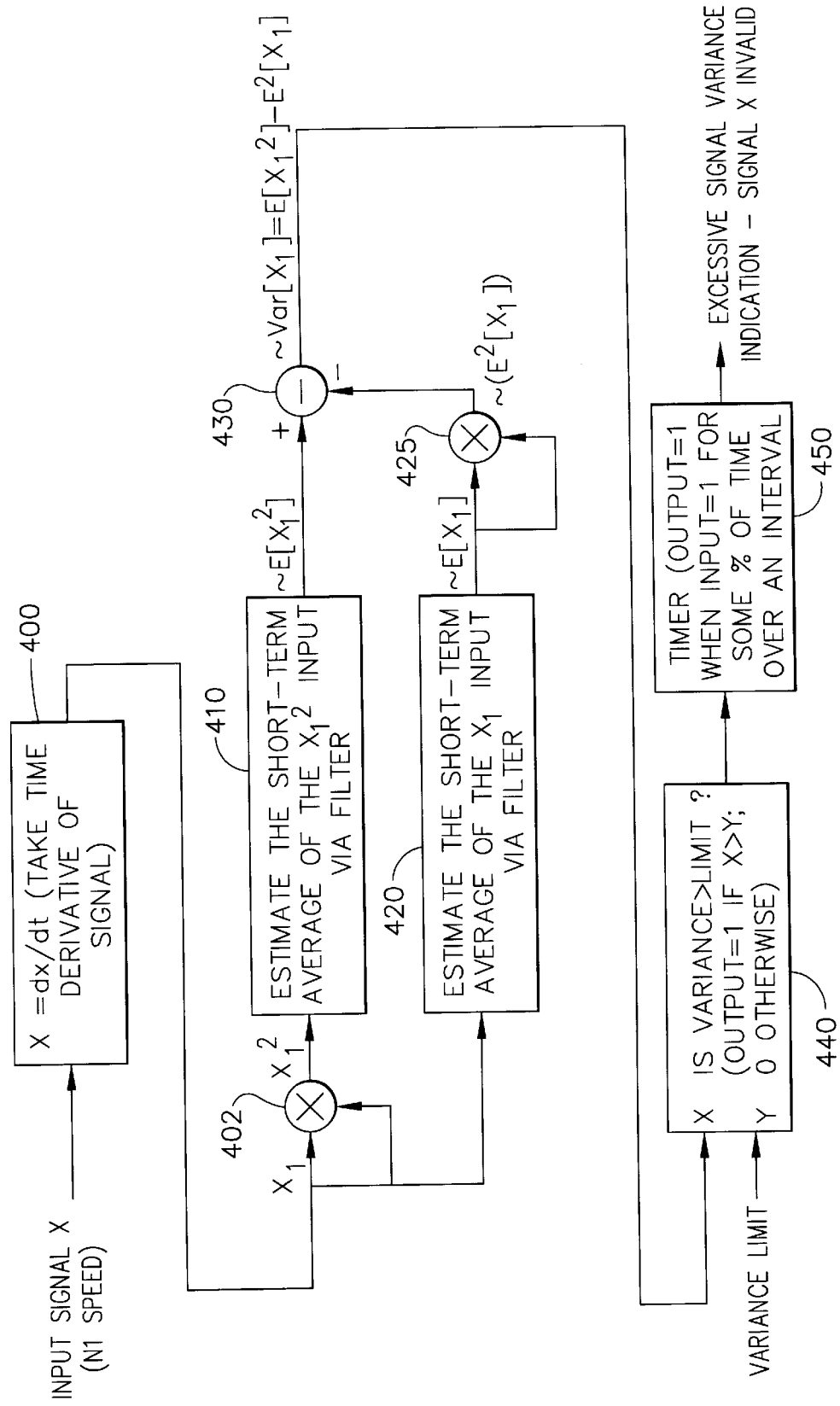
FIG. 4 depicts a block diagram of a signal variance detection logic used for estimation of the short-term variance of a signal rate of change according to a preferred embodiment of the present invention.

FIG. 4 illustrates a block diagram of a signal variance detection logic which implements the method embodiment of the present invention, used for estimation of the short-term variance of a signal rate of change. In element 400, the rate of change (time derivative) of an input signal is calculated. In a multiplier 402, the tested input signal rate of change is squared. In element 410, an estimate average of the squared input signal rate of change is obtained via filtering. In element 420, an estimate average of the input signal rate of change is obtained via filtering. In multiplier 425, this signal is squared. In element 430, an estimate variance is calculated by subtraction of the two estimated signals obtained from elements 410 and 425. In element 440, the calculated estimated variance value is compared with a predefined variance limit of the rate test. In latching counter (timer) 450, it is tested whether the estimated variance exceeds the predefined variance limit for a predefined amount of time. If the estimated variance exceeds the predefined limit for a given amount of time, the signal is deemed to be inaccurate and invalid because the variance is too high to be that of a real signal.

Similar approaches can be used for other gas turbine signals, estimating either the variance of the signal or the variance of the rate of change of the signal, and then comparing the estimated variance with a predefined limit to detect signal failure.

The preferred embodiments of the present invention of may be embedded either into the gas turbine ECU software application or in the ECU hardware circuitry.

An estimate of the average short term variance of an input signal or rate of change is preferably obtained via analog or digital filters. The preferred system embodiments of the present invention preferably use filters which are simple first order lags, but higher order filters or other signal averaging modules may be used as well. Two digital filter methods may be used in the present invention. The first method includes calculation of a rolling average. The second method includes calculation of a filtered value of the input stream.

The method of calculating a rolling average of the z most current signal input reading drops the oldest reading from the average each time a new reading is available. The calculation is performed according to the equation:

$$y(n)=[x(n)+x(n-1)+x(n-2)+ \ldots +x(n-(z-1))]/(z)$$

where: $y(n)$ is the current estimate of the average at iteration n, $x(n)$ is the current value of the input to the filter, $x(n-1)$ is the previous value of the input to the filter, $x(n-2)$ is the 2 nd last value of the input to the filter, and $x(n-(z-1))$ is the $(z-1)$th last value of the input to the filter.

To calculate a filtered value of the input stream, two types of filters can be used in the digital embodiments: finite impulse response filters and infinite impulse response filters. Finite impulse response (FIR) filters calculate a weighted rolling average of the z most current readings; this is similar to a rolling average but with weights. The weights allow tailoring of the frequency response of the averaging, according to the equation:

$$y(n)=[w1x(n)+w2x(n-1)+w3x(n-2)+ \ldots +wz\ x(n-(z-1))]/(w1+w2+w3 \ldots +wz)$$

where: $y(n)$ is the current estimate of the average at iteration n, $x(n)$ is the current value of the input to the filter, $x(n-1)$ is the previous value of the input to the filter, $x(n-2)$ is the 2 nd last value of the input to the filter, $x(n-(z-1))$ is the $(z-1)$th last value of the input to the filter, and $w1$-$wz$ are weighting coefficients used to tailor the frequency or time response characteristics of the filter.

Infinite impulse response (IIR) filters are digital embodiments of standard analog filters. IIR filters weight recent input data more strongly than older data. As a datum become older and older, its weight dwindles to essentially zero.

$$y(n)=a1y(n-1)+a2y(n-2)+ \ldots +az\ y(n-z)+b1x(n)+b2x(n-1)+ \ldots bw\ x(n-(w-1))$$

where: $y(n)$ is the current estimate of the average at iteration n, $y(n-1)$ is the last value of the estimate of the average, $y(n-z)$ is the $(z-1)$th last value of the estimate of the average, $x(n)$ is the current value of the input to the filter, $x(n-1)$ is the last value of the input to the filter, $x(n-(w-1))$ is the $(w-1)$th last value of the input to the filter, a1-az and b1-bw are weighting coefficients used to tailor the frequency or time response characteristics of the filter. The weighting coefficients sum to 1.0.

Analog filter circuitry embodiments of the invention will typically use traditional analog filters that function similarly to digital IIR filters.

The preferred embodiments of the present invention were implemented in the fan speed signal (N1) derived from a suitable fan speed transducer or sensor on AS900, and utilize a simple digital IIR filter for estimating the short term averages, according to the equation:

$$y(n)=0.818\ y(n-1)+0.091\ x(n)+0.091\ x(n-1)$$

where: $y(n)$ is the current estimate of the average, $y(n-1)$ is the last value of the estimate of the average, $x(n)$ is the current value of the input to the filter, $x(n-1)$ is the last value of the input to the filter, and x and y are calculated, depending on the sample rate of N1 speed, at a 50 ms or 100 ms rate. This results in a shift in frequency response of the averager/filter as the sampling rate changes, but produces the desired result in the AS900 N1 speed case.

Figure 5:
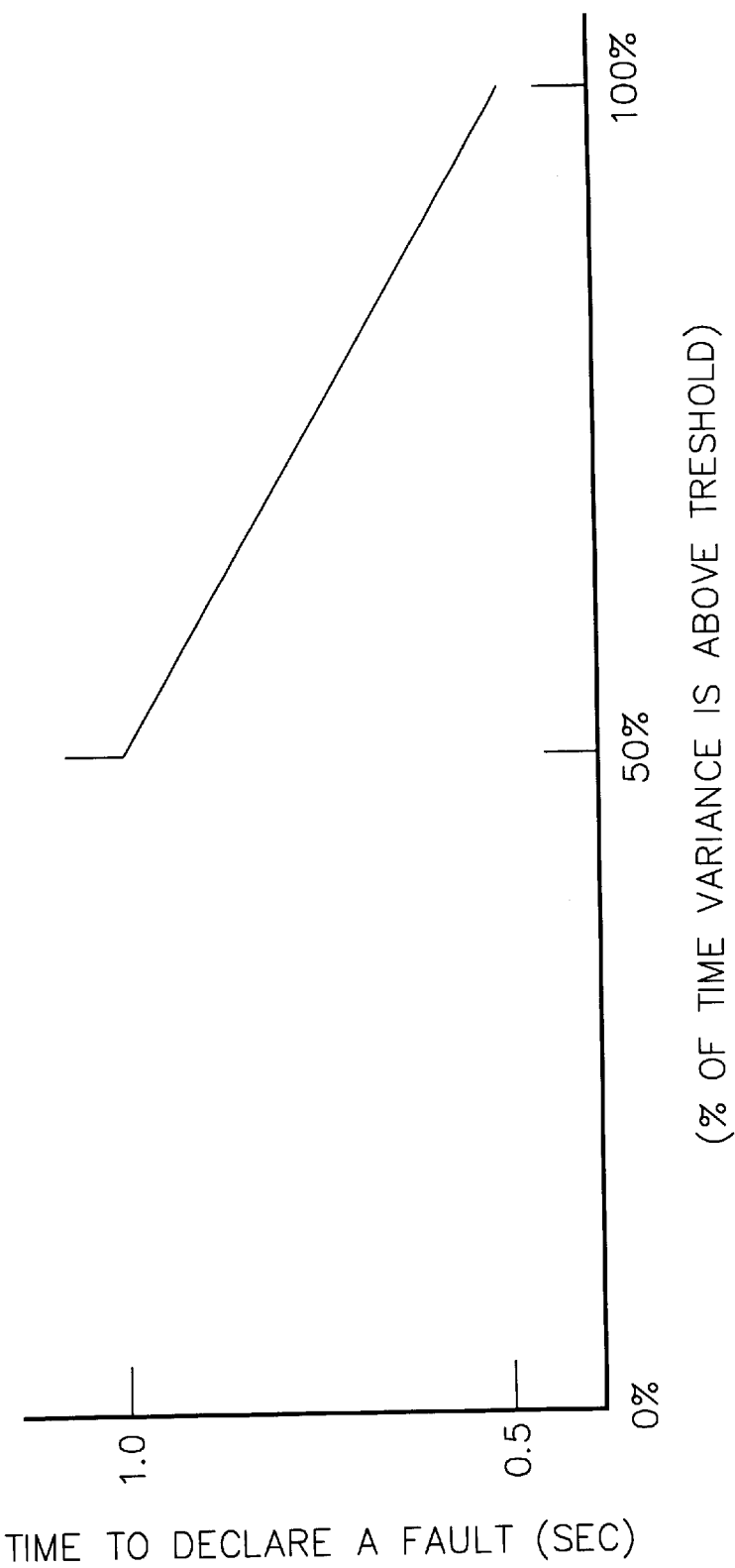
FIG. 5 depicts a functional graph of the latching counter according to a preferred embodiment of the present invention.

Preferably, the latching counter (timer) 250, 450 of the present invention utilizes a unique algorithm that times out faster if the input constantly equals one, as shown in FIG. 5. The timer times out at a slower rate when the input equals one "most of the time". Thus, the rate is dependent on the proportion of time the input equals one.

The preferred embodiments of the present invention may be used in two ways. Firstly, they may be used on-line to detect and accommodate failures as they occur, in order to insure continued safe engine operation, as would be the case with a speed signal failure or blade out event. Secondly, they may be used off-line to predict future failures and allow for maintenance before a future failure occurs, as might be the case with typical gas turbine hot section temperature probes signals that are averaged electrically in the probe assembly. There, although operation is not initially affected as the individual probes fail, variance increases with each probe failure. Moreover, the preferred embodiments of the present invention may be used to determine the validity of sensor signals for any electronic control sensor, such as automotive oxygen content sensors, chemical factory mixture temperature/pressure sensors, etc.

It should be understood, of course, that the foregoing relates to preferred embodiments of the invention and that modifications may be made without departing from the spirit and scope of the invention as set forth in the following claims.

We claim:

1. A signal fault detection method useable in electrical control sensors for shaft speed signal frequency change rate tests, detecting intermittent or "in-range" failures of the signal, comprising:

means for measuring frequency of a shaft speed signal;
means for estimating a short-term variance of the measured signal using the equation: $Var[x]=E[x-E(x)]^2=E$ $[x^2]-E^2[x]$, where x is the measured signal, $E(x)$ is the expected value of x, $E[x]$ is the expected value of $x^2$, calculated by estimating the average of $x^2$ over a predefined short term, and $E^2[x]$ is the squared value of $E[x]$, where $E[x]$ is calculated by estimating the average of the measured signal x over the predefined short term;

means for estimating the short-term variance $Var[x]=E[x^2]-E^2[x]$ by employing the following algorithm: $Var[x]=Filtered [(x)^2]-(Filtered [x])^2$;

means for comparing the estimated variance with a predefined variance limit for a predefined amount of time; and means for deeming the measured signal at least one of faulted and invalid, if the estimated variance exceeds the predefined variance limit for the predefined amount of time.

2. The system according to claim 1, wherein the means for comparing the estimated variance with a predefined variance limit for a predefined amount of time includes a latching counter.

3. The system according to claim 1, wherein the means for estimating a short-term variance of the measured signal by employing an averaging filter to perform the expectation operation, where the averaging filter includes a plurality of filters performing averaging function in the calculation of $E[x^2]$ and $E^2[x]$.

4. The system according to claim 3, wherein the filters selected from a group comprising analog filters, digital IIR filters, digital FIR filters, and rolling average filters.

5. The system according to claim 1, wherein the system being implemented in a software program includes a set of computer-executable program instructions.

6. The system according to claim 1, wherein the system being implemented is in a hardware circuitry.

7. A method useable in electrical control sensors for shaft speed signal frequency change rate tests, detecting intermittent or "in-range" failures, comprising the following steps:

(a) measuring frequency of a shaft speed signal;

(b) estimating a short-term variance of the measured signal using the equation: $Var[x]=E[x^2]-E^2[x]$, where $E[x^2]$ is ] is an estimated average of the squared measured signal over a predefined short term, and $E^2[x]$ is a squared estimated average of the measured signal over the predefined short term;

(c) comparing the estimated short-term variance with a predefined short-term variance limit for a predefined amount of time; and (d) if the estimated short-term variance exceeds the predefined variance limit for the predefined amount of time, deeming the measured signal invalid.

8. The method according to claim 7, wherein the step for comparing the estimated variance with a predefined variance limit for a predefined amount of time uses a latching counter.

9. The method according to claim 7, wherein the step for estimating a short-term variance of the measured signal using a plurality of filters performs averaging function.

10. The method according to claim 9, wherein the filters selected from a group comprising analog filters, digital FIR filters, digital FIR filters, and rolling average filters.

11. The method according to claim 7, wherein the method being implemented in a software program includes a set of computer-executable program instructions executed within a gas turbine engine control system.

12. The method according to claim 7, wherein the method being implemented is in a hardware circuitry.

* * * * *